(12) United States Patent
Kausche et al.

(10) Patent No.: US 11,979,033 B2
(45) Date of Patent: May 7, 2024

(54) METHOD AND DEVICE FOR DETECTING LIVING OBJECTS FOR INDUCTIVE CHARGING DEVICES

(71) Applicant: Vitesco Technologies GmbH, Hannover (DE)

(72) Inventors: Michael Kausche, Munich (DE); Anselm Schwarte, Munich (DE)

(73) Assignee: Vitesco Technologies GmbH, Regensburg (DE)

( * ) Notice: Subject to any disclaimer, the term of this patent is extended or adjusted under 35 U.S.C. 154(b) by 503 days.

(21) Appl. No.: 17/276,327

(22) PCT Filed: Sep. 11, 2019

(86) PCT No.: PCT/EP2019/074211
§ 371 (c)(1),
(2) Date: Mar. 15, 2021

(87) PCT Pub. No.: WO2020/058060
PCT Pub. Date: Mar. 26, 2020

(65) Prior Publication Data
US 2022/0109332 A1    Apr. 7, 2022

(30) Foreign Application Priority Data
Sep. 19, 2018  (DE) .................. 10 2018 215 990.4

(51) Int. Cl.
*H02J 50/60*    (2016.01)
*B60L 53/124*   (2019.01)
(Continued)

(52) U.S. Cl.
CPC ........... *H02J 50/60* (2016.02); *B60L 53/124* (2019.02); *G01S 13/04* (2013.01); *H02J 50/12* (2016.02)

(58) Field of Classification Search
None
See application file for complete search history.

(56) References Cited

U.S. PATENT DOCUMENTS 6,636,757 B1 * 10/2003 Jascob .................. A61B 34/20
324/207.13
9,145,110 B2    9/2015 Van Wiemeersch et al.
(Continued)

FOREIGN PATENT DOCUMENTS

| CN | 104167773 A | 11/2014 |
|----|-------------|---------|
| CN | 105163976 A | 12/2015 |

(Continued)

OTHER PUBLICATIONS

International Search Report and Written Opinion for International Application No. PCT/EP2019/074211, dated Nov. 25, 2019, with partial English translation, 7 pages.
(Continued)

*Primary Examiner* — Jas A Sanghera
(74) *Attorney, Agent, or Firm* — BUCHANAN INGERSOLL & ROONEY PC

(57) ABSTRACT

A device and a method for detecting living objects for inductive charging devices, the inductive charging device having a resonator coil, which is configured to generate an electromagnetic field, and a plurality of living object sensors, which are configured to detect a living object. The method has steps for determining a critical magnetic field limit of the electromagnetic field by magnetic field limit sensors, the critical magnetic field limit being defined in that a magnetic field strength outside the critical magnetic field limit falls below a limit value; and for detecting a living object within the determined, critical magnetic field limit of the electromagnetic field by the living object sensors.

10 Claims, 5 Drawing Sheets

(51) Int. Cl.
    *G01S 13/04* (2006.01)
    *H02J 50/12* (2016.01)

(56) References Cited

U.S. PATENT DOCUMENTS

| | | | |
|---|---|---|---|
| 11,011,944 B2 | 5/2021 | Niizuma | |
| 2014/0333256 A1 | 11/2014 | Widmer et al. | |
| 2015/0303701 A1* | 10/2015 | Terao | H02J 50/60 307/104 |
| 2016/0109564 A1* | 4/2016 | Sieber | B60L 53/36 342/27 |
| 2016/0218559 A1* | 7/2016 | Mehas | H02J 50/60 |
| 2016/0248271 A1 | 8/2016 | Amari | |
| 2017/0259682 A1 | 9/2017 | Oettle et al. | |

FOREIGN PATENT DOCUMENTS

| | | |
|---|---|---|
| CN | 205921464 U | 2/2017 |
| CN | 106688160 A | 5/2017 |
| CN | 107074124 A | 8/2017 |
| CN | 108429363 A | 8/2018 |
| DE | 102014217937 A1 | 3/2016 |
| DE | 102016202817 A1 | 8/2016 |
| WO | 2018/151096 A1 | 8/2018 |

OTHER PUBLICATIONS

International Search Report and Written Opinion for International Application No. PCT/EP2019/074211, dated Nov. 25, 2019, 12 pages (German).
German Examination Report for German Application No. 10 2018 215 990.4, dated May 16, 2019, 9 pages.
German Examination Report for German Application No. 10 2018 215 990.4, dated Mar. 16, 2023 with translation, 11 pages.
Office Action (The First Office Action) issued Dec. 6, 2023, by the State Intellectual Property Office of People's Republic of China in corresponding Chinese Patent Application No. 201980061811.3 and an English translation of the Office Action. (22 pages).

* cited by examiner

METHOD AND DEVICE FOR DETECTING LIVING OBJECTS FOR INDUCTIVE CHARGING DEVICES

CROSS REFERENCE TO RELATED APPLICATIONS

This application is the U.S. National Phase Application of PCT International Application No. PCT/EP2019/074211, filed Sep. 11, 2019, which claims priority to German Patent Application No. 10 2018 215 990.4, filed Sep. 19, 2018, the contents of such applications being incorporated by reference herein.

FIELD OF THE INVENTION

The present invention relates to a method and a device for detecting living objects for inductive charging devices.

BACKGROUND OF THE INVENTION

A conventional inductive charging device as a device for power transmission has a base module, a vehicle module and a wall box. The wall box attached to a wall feeds an input alternating current via a high-voltage line into a transmitter coil located in the base module, which thereby generates an electromagnetic field. Part of the energy of the electromagnetic field generated in the transmitter coil is transmitted into a receiver coil located in the vehicle module, which thereby in turn generates an electromagnetic field with a corresponding output alternating current. The transmitter coil and the receiver coil are referred to as resonator coils, which are arranged in so-called resonators. Arranged in the vehicle is a rectifier, which rectifies the output alternating current and feeds it to a direct voltage charging device for charging a vehicle battery.

The energy transmitted electromagnetically during inductive charging of electric cars or hybrid vehicles has for example values of the order of magnitude of 85 kHz and 11 kW. The high transmission power in the air gap creates a strong electromagnetic alternating field (several mT), which is potentially harmful to health (including being carcinogenic and harmful to fertility). For this reason, radiation for humans is limited, for example in the ICNIRP 1998 standard (Table 7), incorporated herein by reference, when used for inductive charging to 6.25 µT.

As a result, the space around or under the vehicle in which this limit value is exceeded must be monitored and a reaction triggered, for example reducing or switching off the transmission power. The monitoring usually has to take place below the vehicle outline. For this purpose, groups of HF sensor modules can be attached to the base module, with the aid of which the vehicle underbody area and beyond can be monitored.

The vehicle underbody poses an extreme challenge in terms of radar sensors due to the complex reflection issues and high backscatter cross sections. In addition, due to various applications, significant environmental influences (snow, ice, rain, coverings of all kinds, for example wet leaves, etc.) must also be taken into account. In addition, the living objects that can be reliably detected often have extremely small radar signatures and can possibly move very slowly (for example a sleeping cat). On the other hand, regulatory specifications and customer requirements, which require a quick shutdown or power reduction of the energy transmission system in the event of an incident, must be met.

The perimeter area around a base plate of the energy transmission system up to the outer edge of the vehicle underbody and beyond poses a particular challenge, on the one hand to ensure reliable detection of living objects and on the other hand to keep the number of false detections limited. Therefore, there are high demands on a selectivity in the perimeter area and adaptability to specific situations. An added difficulty is that the geometrical dimensions of the detection area are highly variable. While small charging power levels, good vehicle positioning and low vehicle heights generate relatively compact and symmetrical magnetic fields, high charging power levels, poor positioning and large ground clearances can cause significantly enlarged, asymmetrical limits.

As part of the development of inductive charging devices, solutions were sought to reliably detect living objects in the area of the magnetic field of the base unit, but not to react to objects located outside this area. One approach is to detect moving objects with high-frequency sensors. Due to possible customer specifications, it may be necessary to completely install the sensors for air gap monitoring (vehicle underbody and defined adjacent area) in a base plate of the energy transmission system. An added difficulty is that the sensors must function reliably while the energy is being transmitted, with the corresponding requirements for robustness and interference immunity. There are high demands on selectivity in the perimeter area and adaptability to specific situations (for example transmission power, underbody height, vehicle type, etc.).

SUMMARY OF THE INVENTION

An aspect of the present invention is based on the providing a method and a device for detecting living objects for inductive charging devices which switch off the inductive charging device as little as possible but as often as necessary as a result of detection of a living object.

A first aspect of the invention relates to a method for detecting living objects for inductive charging devices, the inductive charging device having a resonator coil, which is configured to generate an electromagnetic field, and a plurality of living object sensors, which are configured to detect a living object. The method has steps for determining a critical magnetic field limit of the electromagnetic field by magnetic field limit sensors, the critical magnetic field limit being defined in that a magnetic field strength outside the critical magnetic field limit falls below a limit value; and for detecting a living object within the determined, critical magnetic field limit of the electromagnetic field by the living object sensors.

The real-time or online determination of the actually existing, critical magnetic field limit enables an increased selectivity to be displayed in the detection of living objects. The net effect of the described procedure is that the power transmission to the resonator coil is only switched off when this is really necessary due to a living object. The transmitted energy is thus maximized, whereby for example high vehicle ranges can be achieved.

The method preferably also includes a step for using a three-dimensional magnetic field model in the step for determining the critical magnetic field limit. The magnetic field model is formed in advance, more preferably offline, by a step for recording three-dimensional coordinates of the critical magnetic field limit under various operating conditions by means of an external magnetic field probe and given determined values that are recorded by the magnetic field limit sensors. The various operating conditions may be a transmitted power, an alignment of the vehicle to the base module or a height distance between the vehicle and the base module. When recording the three-dimensional coordinates of the critical magnetic field limit under the various operating conditions by means of the external magnetic field probe and with the determined values from the magnetic field limit sensors, three-dimensional coordinates of the critical magnetic field limit are obtained.

The method preferably also has steps for determining at least one geometrical solid, which is defined by at least one geometrical parameter and encloses the recorded three-dimensional coordinates of the critical magnetic field limit; and for determining the magnetic field model as a function of the at least one geometrical parameter of the solid in dependence on various values that are recorded by the magnetic field limit sensors. The geometrical solids may be an ellipsoid, a cylinder or a spherical shape.

The method preferably also has steps for segmenting the recorded three-dimensional, critical magnetic field limit by means of various geometrical solids, which are each determined by at least one geometrical parameter and which enclose the recorded three-dimensional coordinates of the critical magnetic field limit; and for determining the magnetic field model as a function of the geometrical parameters of the various solids in dependence on various values that are recorded by the magnetic field limit sensors. The geometrical parameter may be a length, a width, a height, an angle, a radius or a volume of the geometrical solid.

The magnetic field model is preferably stored in advance in a memory of a control unit of the inductive charging device and retrieved during the step for determining the critical magnetic field limit, or it is made available via a network (online).

A second aspect of the invention relates to a device for detecting living objects for an inductive charging device, the inductive charging device having a resonator coil, which is configured to generate an electromagnetic field, and a plurality of living object sensors, which are configured to detect a living object. The device has magnetic field limit sensors for determining a critical magnetic field limit of the electromagnetic field, the critical magnetic field limit being defined in that a magnetic field strength outside the critical magnetic field limit falls below a limit value. The device also has the living object sensors for detecting the living object within the determined, critical magnetic field limit of the electromagnetic field.

In a plan view of the resonator coil, the magnetic field limit sensors are preferably arranged radially between the resonator coil and the living object sensors.

Preferably, the magnetic field limit sensors are (inductive) coils and/or the living object sensors are radar sensors.

Preferably, the resonator coil, the living object sensors and the magnetic field limit sensors are integrated in a resonator module, so that a compact device is created.

Preferably, the inductive charging device is configured to charge an electric vehicle for transporting people or loads.

It should be noted that embodiments of the invention have been described with reference to different subjects of the invention. In particular, some embodiments of the invention are described by way of method claims and other embodiments of the invention are described by way of device claims. However, it will become immediately clear to a person skilled in the art on reading this application that, unless explicitly stated otherwise, in addition to a combination of features which are associated with one type of subject matter of the invention, any combination of features which are associated with different types of subjects of the invention is also possible.

Further advantages and features of aspects of the present invention are apparent from the following description, given by way of example, of a preferred embodiment.

DETAILED DESCRIPTION OF THE PREFERRED EMBODIMENTS

It should be noted that the exemplary embodiments described below are merely a limited selection of possible variant embodiments of the invention.

Figure 1:
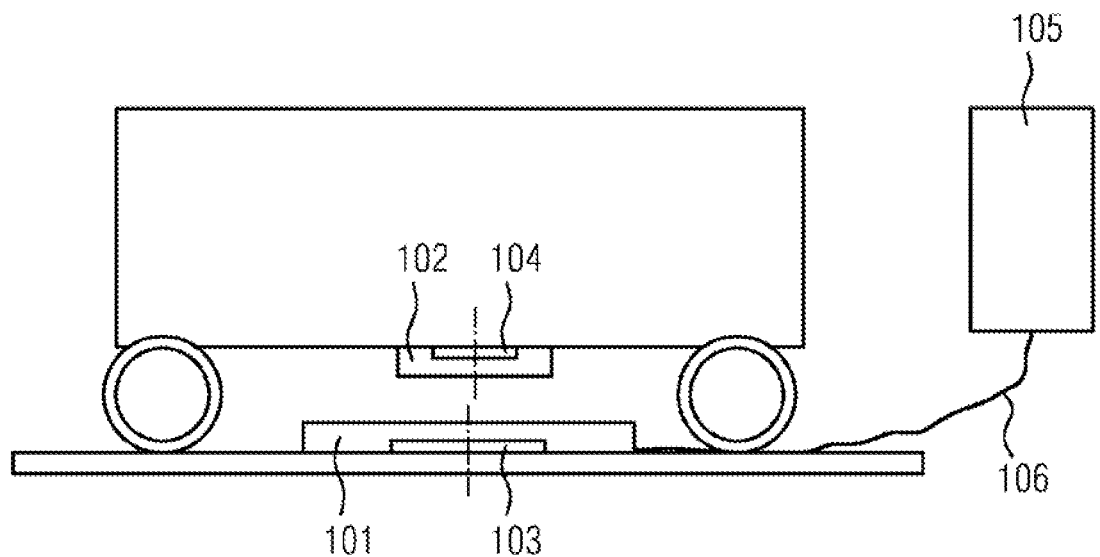
FIG. 1 schematically shows a device for energy transmission according to an exemplary embodiment of the present invention.

FIG. 1 schematically shows a device for energy transmission according to an exemplary embodiment of the present invention in the form of an inductive charging device for an electric vehicle for transporting people or loads. The inductive charging device has a base module 101, a vehicle module 102 and a wall box 105. The wall box 105 attached to a wall feeds an input alternating current via a high-voltage line 106 into a resonator coil (transmitter coil) located in the base module 101, which thereby generates an electromagnetic field. Part of the energy of the electromagnetic field generated in the transmitter coil is transmitted into a resonator coil (receiver coil) located in the vehicle module 102, which thereby in turn generates an electromagnetic field with a corresponding output alternating current. Arranged in the vehicle is a rectifier, which rectifies the output alternating current and feeds it to a direct voltage charging device for charging a vehicle battery.

The transmitter coil and the receiver coil are each referred to as a resonator coil and are arranged in corresponding resonators 103, 104 of the base module 101 and of the vehicle module 102. The resonator coils each form a current-carrying line, which is usually formed by litz wires.

Figure 2:
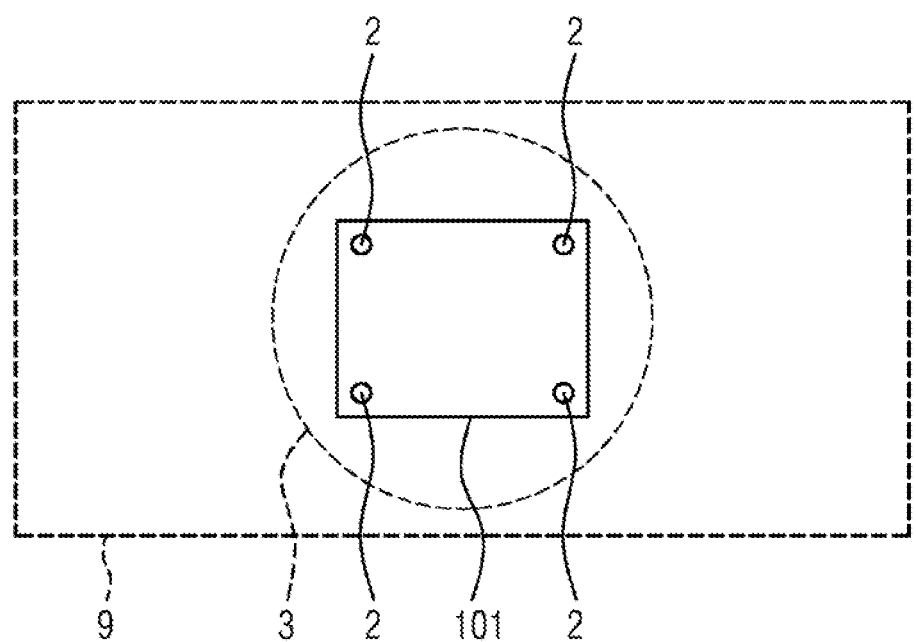
FIG. 2 schematically shows a plan view of an inductive charging device.

FIG. 2 schematically shows a plan view of an inductive charging device in the form of the base module 101. A living object sensor 2 in the form of a radar sensor is installed in each of the four corners of the base module 101. Reference numeral 9 denotes a vehicle outline of a vehicle parked over the base module 101 for charging. Reference numeral 3 denotes a critical magnetic field limit of the electromagnetic field generated by the resonator coil. The critical magnetic field limit 3 is defined in that a magnetic field strength outside the critical magnetic field limit 3 falls below a predetermined limit value.

However, the critical magnetic field limit 3 does not have a constant shape and size, but changes, in some cases significantly, depending on the operating conditions present.

Figure 3:
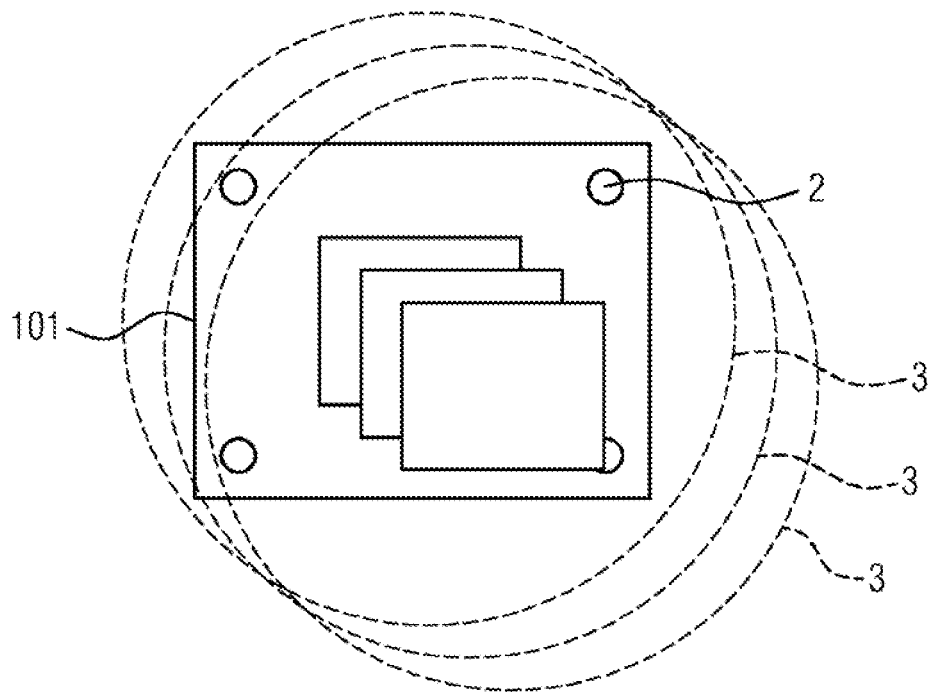
FIG. 3 schematically shows a plan view of an inductive charging device, three different critical magnetic field limits being shown at three different positions of a vehicle above a base module.

FIG. 3 schematically shows a plan view of the inductive charging device, three different critical magnetic field limits 3 being shown at three different positions of the vehicle over the base module 101. Poor positioning of the vehicle tends to lead to distorted and enlarged, critical magnetic field limits 3.

Figure 4:
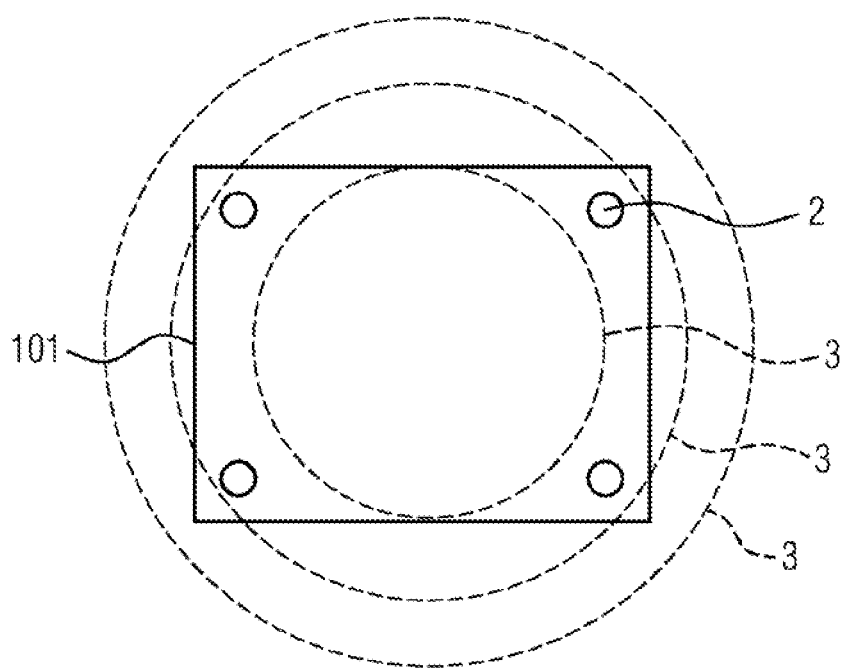
FIG. 4 schematically shows a plan view of an inductive charging device, three different critical magnetic field limits being shown at three different magnetic field strengths.

FIG. 4 schematically shows a plan view of the inductive charging device, three different critical magnetic field limits 3 being shown with three different magnetic field strengths. An increase in the charging power usually also leads to increased, critical magnetic field limits 3.

Figure 5:
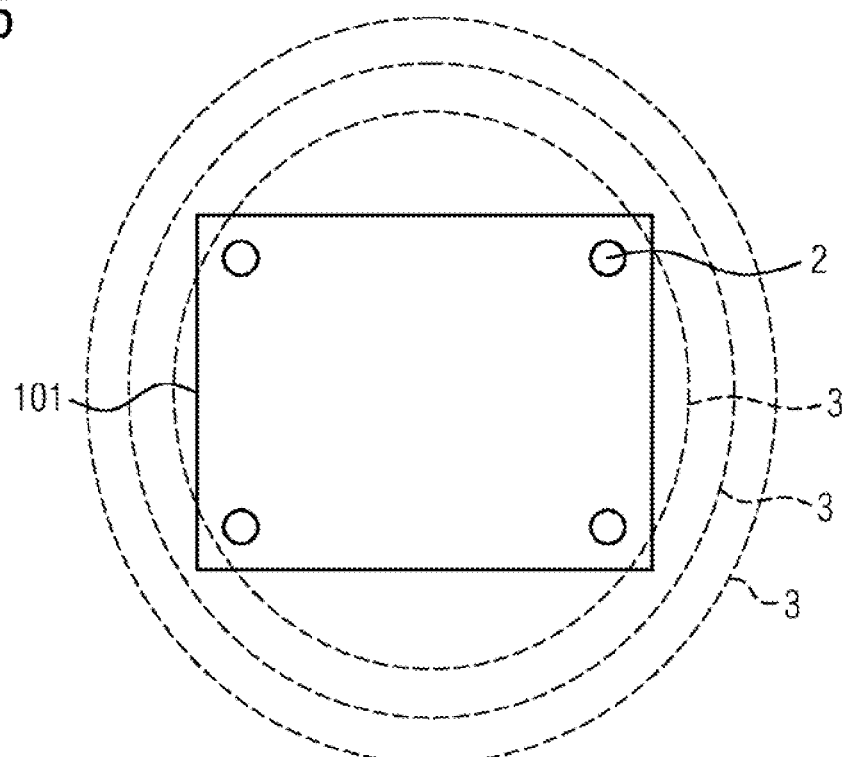
FIG. 5 schematically shows a plan view of an inductive charging device, three different critical magnetic field limits being shown at three different height distances between a vehicle floor and a base module.

FIG. 5 schematically shows a plan view of the inductive charging device, three different critical magnetic field limits 3 being shown at three different height distances between a vehicle floor and the base module 101. In contrast, a lower-lying vehicle will in most cases lead to a reduction in the critical magnetic field limits 3.

Therefore, a living object that is located at a certain point can sometimes be within the critical magnetic field limit 3 and sometimes outside it. Without knowing the current, critical magnetic field limits 3, the only feasible option is to interrupt the power transmission to switch off the magnetic field. A battery that is not fully charged and the resulting reduced vehicle range would be the consequence. It is therefore desirable to determine the current, critical magnetic field limits 3 in order to ensure maximum power transmission.

The concept presented below is based on a combination of the sensor signals of several living object sensors 2 with additional magnetic field limit sensors 4 for determining local magnetic field strengths or for measuring the magnetic field.

Figure 6:
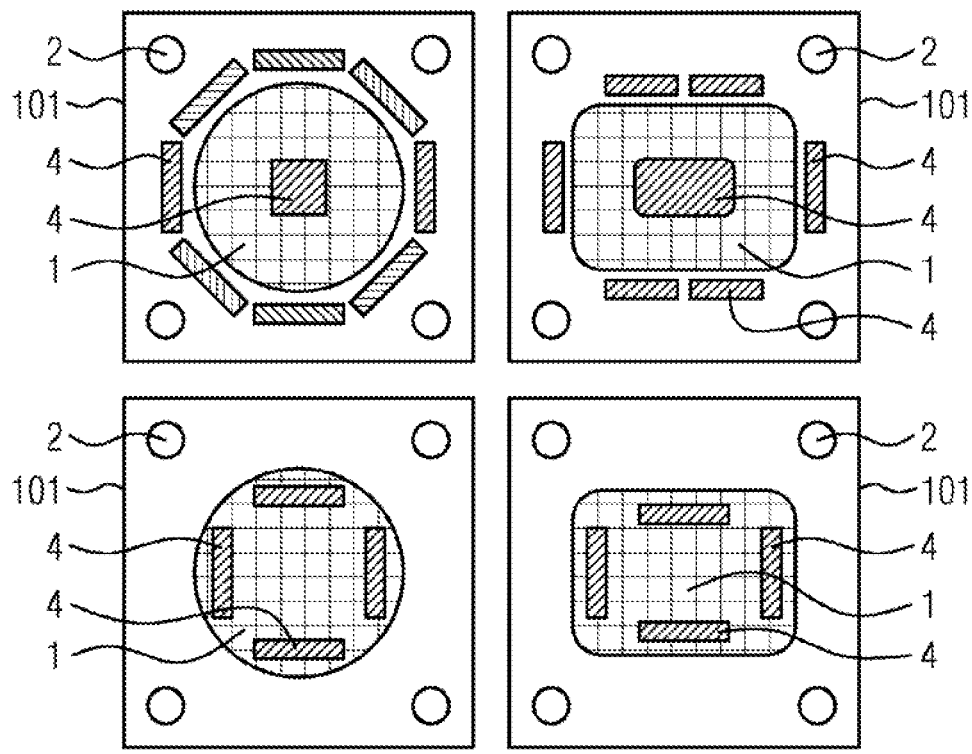
FIG. 6 shows four different exemplary embodiments of an arrangement of magnetic field limit sensors in a base module.

FIG. 6 shows four different exemplary embodiments of an arrangement of magnetic field limit sensors 4 in a base module 101. All of the sensors 2, 4 are integrated in the base module 101.

The magnetic field limit sensors 4 preferably operate on the induction principle, and they can be designed as simple, and thus inexpensive, coils with one or more turns. Their number, size, shape and arrangement should be made to suit the topology of the system under consideration.

In the image at the top left and in the image at the bottom left in FIG. 6, exemplary embodiments of circular primary coil concepts are shown. In the image at the top left in FIG. 6, a plurality of, for example six, magnetic field limit sensors 4 are arranged in a rotationally and mirror-symmetrical manner radially outside a resonator coil 1. In addition, a central magnetic field limit sensor 4 is arranged in the center of the resonator coil 1. In the plan view of the resonator coil 1, the outer six magnetic field limit sensors 4 are arranged radially between the resonator coil 1 and the living object sensors 2, one of which is located in each one of the four corners of the base module 101. In the image at the bottom left of FIG. 6, a plurality of, for example four, magnetic field limit sensors 4 are arranged in a rotationally and mirror-symmetrical manner radially inside the resonator coil 1. In the plan view of the resonator coil 1, the resonator coil 1 is arranged radially between the magnetic field limit sensors 4 and the living object sensors 2, one of which is located in each one of the four corners of the base module 101.

In the image at the top right and in the image at the bottom right of FIG. 6, exemplary embodiments of rectangular primary coil concepts are shown. In the image at the top right of FIG. 6, a plurality of, for example six, magnetic field limit sensors 4 are arranged in a rotationally and mirror-symmetrical manner radially outside a resonator coil 1. In addition, a central magnetic field limit sensor 4 is arranged in the center of the resonator coil 1. In the plan view of the resonator coil 1, the outer six magnetic field limit sensors 4 are arranged radially between the resonator coil 1 and the living object sensors 2, one of which is located in each one of the four corners of the base module 101. In the image at the bottom right of FIG. 6, a plurality of, for example four, magnetic field limit sensors 4 are arranged in a rotationally and mirror-symmetrical manner radially inside the resonator coil 1. In the plan view of the resonator coil 1, the resonator coil 1 is arranged radially between the magnetic field limit sensors 4 and the living object sensors 2, one of which is located in each one of the four corners of the base module 101. A coil axis of the four magnetic field limit sensors 4 is in each case essentially parallel to a corresponding side of the rectangular resonator coil 1.

In an exemplary embodiment, the number and the arrangement of the living object sensors 2 and the magnetic field limit sensors 4 can be optimized in a coupled manner.

The signals of the induction-based magnetic field limit sensors 4 represent in first approximation a sinusoidal signal, the frequency of which is equal to the frequency of the primary magnetic field. The amplitude of this signal is proportional to the mean local magnetic field strength. If flat (two-dimensional) coils are used, they can only measure an orthogonal magnetic field component. However, the defined limit values are based on effective values that contain all three spatial directions. There are several possible ways of avoiding this problem:

- modeling and the associated transformation of a one-dimensional measurement into three-dimensional effective values;
- more complex coil geometry, for example a cube with three mutually orthogonal coils;
- different individual coils tilted toward one another.

The system should be able not only to determine the local magnetic field values, but also to infer values that are far outside the physical limits of the base module 101 (cf. FIG. 2 and FIGS. 3 to 5). Modeling is therefore useful. A comprehensive determination of the three-dimensional critical magnetic field limit 3 under all relevant operating conditions can be the basis for the modeling.

A method for detecting living objects for inductive charging devices is described below with reference to the exemplary embodiment of FIG. 7. In the case of the exemplary embodiment of FIG. 7, which comprises steps S1 to S5, a magnetic field model is used. The magnetic field model is determined in advance in steps S1 to S3, i.e. offline in the area 7 of an offline analysis.

In a step S1, three-dimensional coordinates of the critical magnetic field limit 3 are first recorded under various operating conditions by means of an external magnetic field probe (not shown) and given certain values, which are recorded by the magnetic field limit sensors 4. The various operating conditions may be various charging power levels, various alignments and/or positions of the vehicle above the base module 101, various height distances of the vehicle over the base module 101, etc. In this regard, the operating states that have already been explained in FIGS. 3 to 5 may be involved. The external magnetic field probe, not shown, is positioned in such a way that it measures precisely at the current critical magnetic field limit 3 and thus indirectly establishes its 3D coordinates. As a result, in step S1, a complex 3D surface of the critical magnetic field limit 3 is obtained for the corresponding operating states.

As soon as the measurement data are available, the modeling can take place. In a step S2, at least one geometrical solid 6 is determined, which is defined by at least one geometrical parameter x and encloses the recorded three-dimensional coordinates of the critical magnetic field limit 3. The geometrical solid 6 may be for example an ellipsoid, a cylinder or a spherical surface, and the geometrical parameter x may be a radius, a base area, a volume and/or an axial length of the ellipsoid, of the cylinder or of the spherical surface. The geometrical solid 6 is chosen such that on the one hand it encloses the recorded three-dimensional coordinates of the critical magnetic field limit 3, but on the other hand it is as small as possible. The geometrical solid 6 can accordingly be approximated to the critical magnetic field limit 3 by an approximation method.

In a step S3, the magnetic field model is determined as a function $f$ of the at least one geometrical parameter x of the solid 6 in dependence on various values that are recorded by the magnetic field limit sensors 4. The following equation applies:

$$x = f(\text{detected values of the magnetic field limit sensors 4}).$$

In a step S4, the critical magnetic field limit 3 of the electromagnetic field is finally determined using the magnetic field model determined in this way and by the actually measured values of the magnetic field limit sensors 4.

In a step S5, it is then detected by the living object sensors 2 whether or not a living object is present within the determined, critical magnetic field limit 3 of the electromagnetic field. If the living object is detected by the living object sensors 2 within the specific, critical magnetic field limit 3 of the electromagnetic field, either the resonator coil 1 may be switched off or its power reduced.

In contrast to steps S1 to S3, steps S4 and S5 are carried out online, i.e. in area 8 of an online application.

Figure 7:
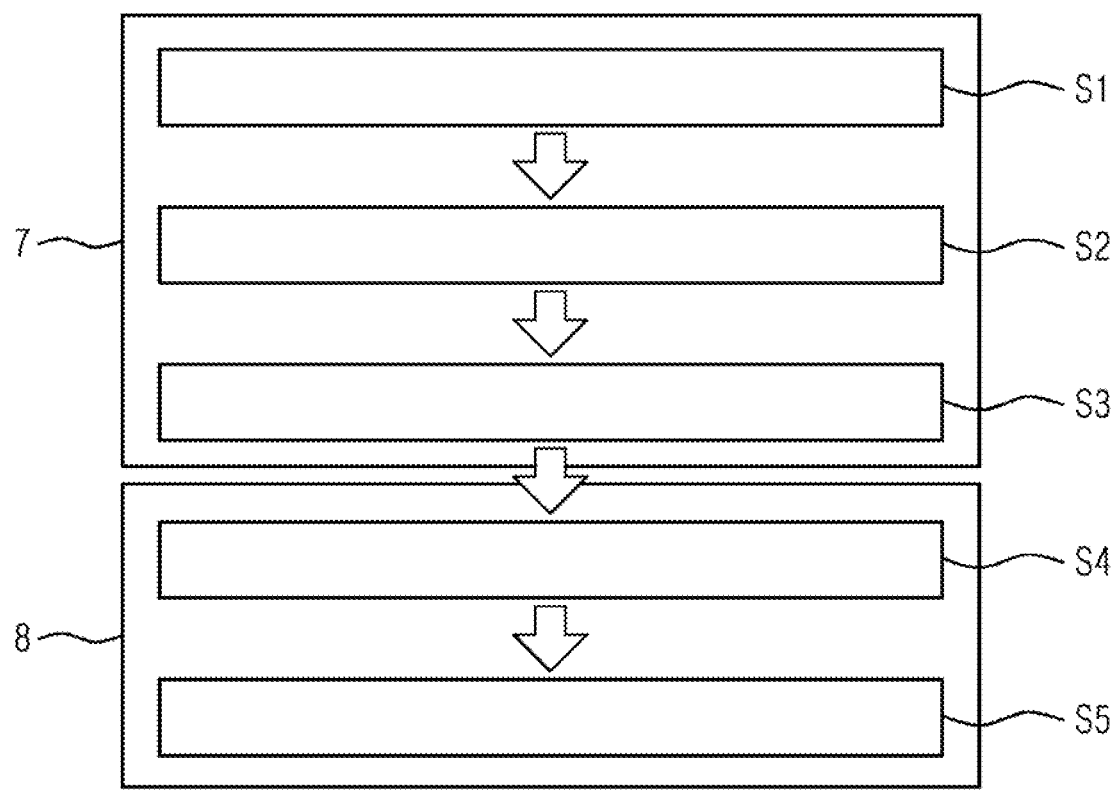
FIG. 7 shows a flow diagram of the method according to an exemplary embodiment using a magnetic field model.
Figure 8:
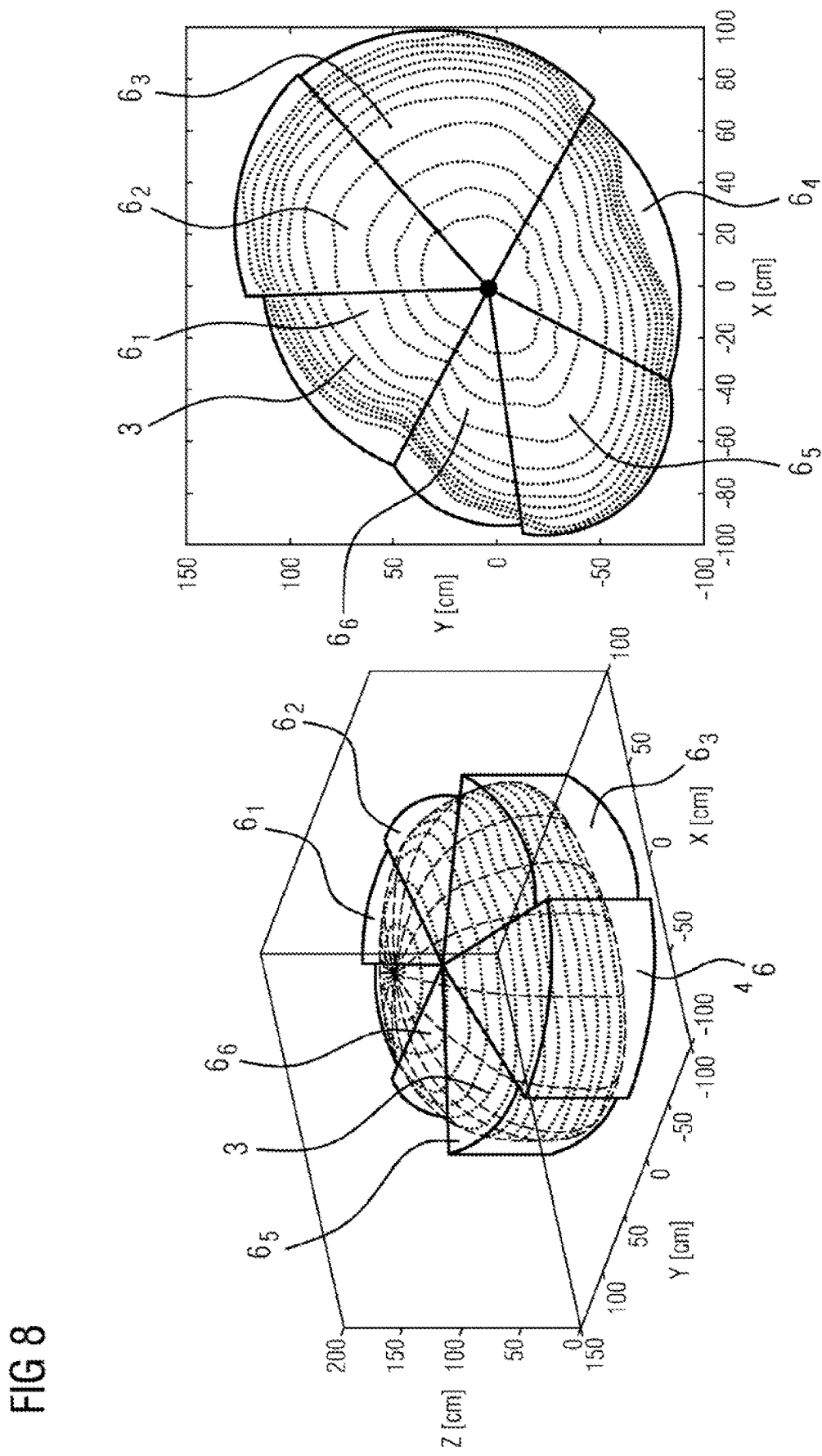
FIG. 8 schematically shows a segmentation of a recorded three-dimensional, critical magnetic field limit by various geometrical solids in the case of the method according to FIG. 7.

FIG. 8 schematically shows, in another exemplary embodiment, a segmentation of the recorded three-dimensional, critical magnetic field limit 3 by six different geometrical solids 61 to 66 in the case of the method according to FIG. 7. FIG. 8 shows by way of example a segmented cylinder together with hypothetical measurement data.

This variant of the modeling is the division or segmentation of the 3D space into various adjacent segments 6i with i=1 . . . n, which represent simple geometrical shapes. The individual parameters $x_i$ of these shapes 6$_i$ (length, width, height, angle, radius, volume) can then be described as functions of the signals of the internal magnetic field limit sensors 4 (see FIG. 7, blocks 2 and 3). In this exemplary embodiment, too, the defined overall shape of all of the adjacent segments 6i always represents an envelope of the three-dimensional measurement points for a specific operating state. The following equation applies:

$$x_i = f(\text{detected values of the magnetic field limit sensors 4}).$$

The steps S1 to S3 in the area of the offline analysis 7 may also be omitted, if either no magnetic field model is used at all or the magnetic field model already exists. If no magnetic field model is used, the critical magnetic field limit 3 of the electromagnetic field can also be recorded directly by the magnetic field limit sensors 4, for example exclusively in the area 8 of the online application.

The magnetic field model may be stored in advance in a memory of a control unit of the inductive charging device 101 and be retrieved during the step for determining the critical magnetic field limit 3, or it may be made available via a network, i.e. online.

The transfer function of the internal magnetic field measurement to the critical magnetic field limit 3 can then be implemented on a control unit, so that it can be evaluated during operation (online). The results of this evaluation are then linked to the signals of the living object primary sensor system (living object sensors 2) in order to make the final decision (switch off magnetic field yes/no).

The living object sensors 2 (radar sensors) should be able to determine the position of the living object. Various options are available. For example, a frequency-modulated system (FMCW) may determine the distance from the sensors directly. A constant frequency (CW) system does not have this capability; however, by using several CW sensors, it is possible to infer the position of the living object indirectly by evaluating the individual signal intensities.

The connection of internal magnetic field limit sensors 4 and living object sensors 2 (living object primary sensor system) is not limited to the combination of induction coils and radar sensors. A combination of Hall effect-based magnetic field measurement and a camera-based living object sensor system would also be conceivable.

The net effect of the procedure described is that the power transmission is only switched off when this is really necessary due to a detected living object. In other words: The selectivity is increased.

Possible applications are all areas in which strong magnetic fields can occur and at the same time living objects have access to them, for example in production halls, in power plants, induction cookers, magnetically operated loudspeakers or substations.

The invention claimed is:

1. A method for detecting living objects for inductive charging devices, the inductive charging device having a resonator coil, which is configured to generate an electromagnetic field, and a plurality of living object sensors, which are configured to detect a living object, the method comprising:

using a three-dimensional magnetic field model, determining a critical magnetic field limit of the electromagnetic field by magnetic field limit sensors, the critical magnetic field limit being defined in that a magnetic field strength outside the critical magnetic field limit falls below a limit value, and the magnetic field model being formed in advance by recording three-dimensional coordinates of the critical magnetic field limit under various operating conditions by an external magnetic field probe and given determined values that are recorded by the magnetic field limit sensors; and detecting the living object within the determined, critical magnetic field limit of the electromagnetic field by the living object sensors.

2. The method as claimed in claim 1, further comprising:

determining at least one geometrical solid, which is defined by at least one geometrical parameter and encloses the recorded three-dimensional coordinates of the critical magnetic field limit; and determining the magnetic field model as a function of the at least one geometrical parameter of the solid in dependence on various values that are recorded by the magnetic field limit sensors.

3. The method as claimed in claim 1,
the magnetic field model being stored in advance in a memory of a control unit of the inductive charging device and retrieved during the step for determining the critical magnetic field limit, or it being made available via a network.

4. A method for detecting living objects for inductive charging devices, the inductive charging device having a resonator coil, which is configured to generate an electromagnetic field, and a plurality of living object sensors, which are configured to detect a living object, the method comprising:
   determining a critical magnetic field limit of the electromagnetic field by magnetic field limit sensors, the critical magnetic field limit being defined in that a magnetic field strength outside the critical magnetic field limit falls below a limit value;
   segmenting a three-dimensional, critical magnetic field limit by various geometrical solids, which are each determined by at least one geometrical parameter and which enclose three-dimensional coordinates of the critical magnetic field limit;
   determining the magnetic field model as a function of the geometrical parameters of the various solids in dependence on various values that are recorded by the magnetic field limit sensors; and
   detecting the living object within the determined, critical magnetic field limit of the electromagnetic field by the living object sensors.

5. A device for detecting living objects for an inductive charging device, the inductive charging device having a resonator coil, which is configured to generate an electromagnetic field, and a plurality of living object sensors, which are configured to detect a living object with:
   magnetic field limit sensors for determining, by using a three-dimensional magnetic field model, a critical magnetic field limit of the electromagnetic field, the critical magnetic field limit being defined in that a magnetic field strength outside the critical magnetic field limit fails below a limit value, and the magnetic field model being formed in advance by recording three-dimensional coordinates of the critical magnetic field limit under various operating conditions by an external magnetic field probe and given determined values that are recorded by the magnetic field limit sensors; and
   the living object sensors for detecting the living object within the determine, critical magnetic field limit of the electromagnetic field.

6. The device as claimed in claim 5, wherein
in a plan view of the resonator coil, the magnetic field limit sensors are arranged radially between the resonator coil and the living object sensors.

7. The device as claimed in claim 6, wherein the magnetic field limit sensors are coils and/or wherein the living object sensors are radar sensors.

8. The device as claimed in claim 5, wherein
the magnetic field limit sensors are coils and/or wherein the living object sensors are radar sensors.

9. The device as claimed in claim 5, wherein
the resonator coil, the living object sensors and the magnetic field limit sensors are integrated in a resonator module.

10. The device as claimed in claim 5,
wherein the inductive charging device is configured to charge an electric vehicle for transporting people or loads.

* * * * *

UNITED STATES PATENT AND TRADEMARK OFFICE
CERTIFICATE OF CORRECTION

| | | |
|---|---|---|
| PATENT NO. | : 11,979,033 B2 | Page 1 of 1 |
| APPLICATION NO. | : 17/276327 | |
| DATED | : May 7, 2024 | |
| INVENTOR(S) | : Michael Kausche and Anselm Schwarte | |

It is certified that error appears in the above-identified patent and that said Letters Patent is hereby corrected as shown below:

In the Claims

In Column 10, Line 8 of Claim 5: delete "fails" and insert -- falls --.

In Column 10, Line 16 of Claim 5: delete "determine," and insert -- determined, --.

Signed and Sealed this
Second Day of September, 2025

Coke Morgan Stewart
*Acting Director of the United States Patent and Trademark Office*